(12) United States Patent
Pech et al.

(10) Patent No.: US 11,153,145 B2
(45) Date of Patent: Oct. 19, 2021

(54) SYSTEM AND METHOD OF A CENTRALIZED GATEWAY THAT COORDINATES BETWEEN MULTIPLE EXTERNAL CONTROLLERS WITHOUT EXPLICIT AWARENESS

(71) Applicant: Arista Networks, Inc., Santa Clara, CA (US)

(72) Inventors: Andre Pech, San Francisco, CA (US); Chandrashekhar Appanna, Saratoga, CA (US)

(73) Assignee: Arista Networks, Inc., Santa Clara, CA (US)

( * ) Notice: Subject to any disclaimer, the term of this patent is extended or adjusted under 35 U.S.C. 154(b) by 248 days.

(21) Appl. No.: 15/891,106

(22) Filed: Feb. 7, 2018

(65) Prior Publication Data

US 2018/0359134 A1 Dec. 13, 2018

Related U.S. Application Data

(60) Provisional application No. 62/516,487, filed on Jun. 7, 2017.

(51) Int. Cl.
*H04L 12/24* (2006.01)
*H04L 29/08* (2006.01)
(Continued)

(52) U.S. Cl.
CPC ........ *H04L 41/042* (2013.01); *H04L 41/0893* (2013.01); *H04L 41/12* (2013.01);
(Continued)

(58) Field of Classification Search
CPC ... H04L 41/042; H04L 41/0893; H04L 41/12; H04L 63/029; H04L 63/101; H04L 63/20;
(Continued)

(56) References Cited

U.S. PATENT DOCUMENTS 9,450,817 B1 * 9/2016 Bahadur ................. H04L 45/64
2005/0091313 A1 * 4/2005 Zhou ..................... H04L 12/185
709/204

(Continued)

*Primary Examiner* — Kevin T Bates
*Assistant Examiner* — Lesa M Kennedy
(74) *Attorney, Agent, or Firm* — Fountainhead Law Group P.C.

(57) ABSTRACT

A method and apparatus of a device that restricts data communicated between a plurality of computing management devices and a plurality of computing devices is described. In one embodiment, a gateway receives network connectivity information of a network for a plurality of computing management devices and a plurality of computing devices, where the plurality of computing devices is coupled to the plurality of computing management devices via a plurality of network elements. In addition, the gateway determines a plurality of sub-networks using at least the network connectivity information, wherein for each of the plurality of sub-networks, at least one of the plurality of computing management devices and a subset of the plurality of computing devices is associated with that sub-network. Furthermore, for each of the plurality of sub-networks and for each pair of computing devices in the associated subset of plurality of computing devices, the gateway determines a policy for data being communicated between this pair of computing devices and the gateway configures at least one of the plurality of network elements coupled to this pair of computing devices to allow data communicated between this pair of computing devices using at least the first policy.

21 Claims, 8 Drawing Sheets

(51) Int. Cl.
*H04L 29/06* (2006.01)
*H04L 29/12* (2006.01)

(52) U.S. Cl.
CPC .......... *H04L 63/029* (2013.01); *H04L 63/101* (2013.01); *H04L 63/20* (2013.01); *H04L 67/1076* (2013.01); *H04L 61/6022* (2013.01)

(58) Field of Classification Search
CPC ............ H04L 67/1076; H04L 61/6022; H04L 63/0227; H04L 41/085; H04L 45/02
See application file for complete search history.

(56) References Cited

U.S. PATENT DOCUMENTS

| | | | | |
|---|---|---|---|---|
| 2012/0307682 | A1* | 12/2012 | Johnsen | H04L 9/3234 370/254 |
| 2014/0016505 | A1* | 1/2014 | Smith | H04L 41/022 370/254 |
| 2014/0233569 | A1* | 8/2014 | Yong | H04L 45/308 370/392 |
| 2014/0337865 | A1* | 11/2014 | Doughty | G06F 8/30 719/328 |
| 2015/0016270 | A1* | 1/2015 | Hammann | H04L 43/0817 370/241 |
| 2016/0337272 | A1* | 11/2016 | Berman | H04L 49/70 |
| 2017/0104757 | A1* | 4/2017 | Bugenhagen | H04W 4/70 |
| 2017/0149775 | A1* | 5/2017 | Bachar | H04L 67/303 |

* cited by examiner

SYSTEM AND METHOD OF A CENTRALIZED GATEWAY THAT COORDINATES BETWEEN MULTIPLE EXTERNAL CONTROLLERS WITHOUT EXPLICIT AWARENESS

RELATED APPLICATIONS

The present application claims the benefit of priority of prior, provisional application Ser. No. 62/516,487, filed Jun. 7, 2017, the entirety of which is hereby incorporated herein by reference.

FIELD OF INVENTION

This invention relates generally to data networking and more particularly to coordinating multiple external controllers using a centralized gateway without the multiple external controllers having explicit awareness of this coordination.

BACKGROUND OF THE INVENTION

Enterprises can use orchestration systems to manage large number of physical and virtual devices in a network. An orchestration system (OS) allows for the automated arrangement, coordination, and management of computer systems, middleware, and services. In addition, these orchestration systems can be used to define policies and service levels through automated workflows, provisioning, and change management. Orchestration also provides centralized management of the resource pool, including billing, metering, and chargeback for consumption. For example, orchestration reduces the time and effort for deploying multiple instances of a single application. For example, orchestration systems can be used to manage virtual machines across multiple servers and network elements so as to support software-as-a-service (SaaS), infrastructure-as-a-service (IaaS), and/or platform-as-a-service (PaaS). In this example, an orchestration system manages the virtual machines on different servers located in the network.

In addition, the enterprise employs an overlay controller (OVC) to manage the network elements that are used to support the servers and virtual machines managed by the orchestration system. For example, each rack of servers would further include a top-of-the-rack network element that is used to couple this rack of servers with the rest of the data center network. The OVC can be used to manage and set policies on these top-of-the-rack network elements.

A problem can occur if the enterprise uses two (or more) different OS/OVC to manage the enterprise network. It is hard to integrate multiple OS/OVC in the same network because the multiple OS/OVCs, especially if from different vendors, may try to manage and possibly configure the same devices. For example, two different OS/OVC from different vendors could give a network element configuration that can be inconsistent with the functions the OS/OVC are trying to configure on that device.

SUMMARY OF THE DESCRIPTION

A method and apparatus of a device that restricts data communicated between a plurality of computing management devices and a plurality of computing devices is described. In one embodiment, a gateway receives network connectivity information of a network for a plurality of computing management devices and a plurality of computing devices, where the plurality of computing devices is coupled to the plurality of computing management devices via a plurality of network elements. In addition, the gateway determines a plurality of sub-networks using at least the network connectivity information, wherein for each of the plurality of sub-networks, at least one of the plurality of computing management devices and a subset of the plurality of computing devices is associated with that sub-network. Furthermore, for each of the plurality of sub-networks and for each pair of computing devices in the associated subset of plurality of computing devices, the gateway determines a policy for data being communicated between this pair of computing devices and the gateway configures at least one of the plurality of network elements coupled to this pair of computing devices to allow data communicated between this pair of computing devices using at least the first policy.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

A method and apparatus of a device that restricts data communicated between a plurality of computing management devices and a plurality of computing devices is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that installs a new access control list for a port of a network element is described. In one embodiment, a gateway is coupled to multiple OS/OVC and the rest of the network. The gateway presents subset(s) of the network to each of the different OS/OVC, where the associated network subset is the set of the devices that this OS/OVC is configured to manage. In addition, the gateway can partition the network at the device/port level, or device/port/protocol level. In this example, device A, port A could be assigned to OS/OVC A and device A, port B could be assigned to OS/OVC B.

In one embodiment, the gateway partitions the network by configuring network element such that data that is communicated between OS/OVC and devices in the network. In one embodiment, the gateway determines which devices in the network are configured for which and the OS/OVC. For example and in one embodiment, if a one of the devices in the network is part of sub-network for a particular OS/OVC, the gateway can set a policy for one or more network element on the communication path between that device and the OS/OVC. If not, the gateway creates a policy the restricts data communicated between the OS/OVC and that device. In this embodiment, by setting policies, the gateway can restrict the view an OS/OVC has of the network.

In addition, the gateway can configure network elements in the network to allow or disallow data being communicated with a particular OS/OVC and devices in the network using the determined policies. In one embodiment, the gateway can send configuration commands to set policy on different network elements in the network to allow or disallow data being communicated between a particular OS/OVC and one or more devices in the network. For example and in one embodiment, the gateway can configure Access Control Lists (ACLs) on ports of network elements to allow or disallow data between different OS/OVCs and devices to so enforce a partitioning of the network.

Figure 1:
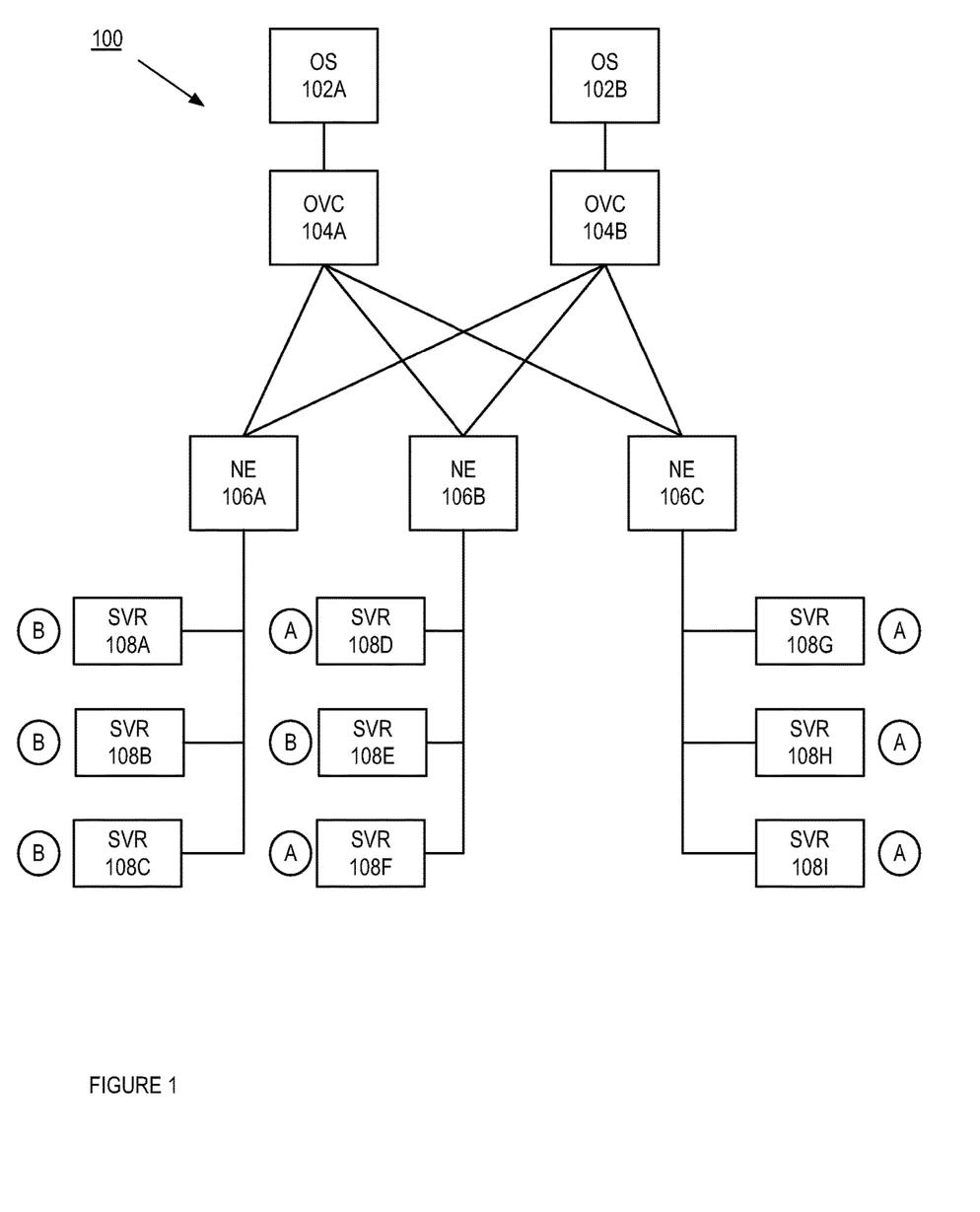
FIG. 1 is a block diagram of one embodiment of a system with multiple OS (orchestration systems)/OVC (overlay controllers) managing a network of network elements and servers.

FIG. 1 is a block diagram of one embodiment of a system with multiple OS (orchestration systems)/OVC (overlay controllers) managing a network of network elements and servers. In FIG. 1, the network 100 includes the network elements 106A-C that are coupled to the servers 108A-I. In one embodiment, the network elements 106A-C each are a device that provides network access to a network (e.g., physical network, virtualized network, etc.). A network element can be a switch, router, hub, bridge, gateway, etc., or any type of device that can allow access to a network. In one embodiment, each of the network elements 106A-C can be a virtual machine. In one embodiment, the servers 108A-I is any type of computing device that can communicate network data with another device (e.g., a personal computer, laptop, server, mobile device (e.g., phone, smartphone, personal gaming device, etc.), another network element, etc.). In one embodiment, each of the servers 108A-I can be a virtual machine or can be a device that hosts one or more virtual machines. While in one embodiment, the network element 100 includes three network elements 106A-C and nine servers 108A-I, in alternate embodiments there can be more or less network elements and/or servers (e.g., hundreds of network elements and thousands of servers).

Furthermore, the network 100 includes multiple OS/OVC systems (OS 102A-B and OVC 104A-B). As described above, an OS system allows for the automated arrangement, coordination, and management of computer systems, middleware, and services. In addition, these orchestration systems can be used to define policies and service levels through automated workflows, provisioning, and change management. Orchestration also provides centralized management of the resource pool, including billing, metering, and chargeback for consumption. For example, orchestration reduces the time and effort for deploying multiple instances of a single application. For example, orchestration systems can be used to manage virtual machines across multiple servers and network elements so as to support software-as-a-service (SaaS), infrastructure-as-a-service (IaaS), and/or platform-as-a-service (PaaS). In this example, the OS 102A-B can manage the virtual machines on different servers 108A-I located in the network 100.

In addition, the network 100 includes OVC 104A-B, which are used to manage the network elements (e.g., network elements 106A-C) that are used to support the servers 108A-I and virtual machines managed by the orchestration system. For example, each rack of servers would further include a top-of-the-rack network element (e.g., network elements 106A-C) that is used to couple this rack of servers with the rest of the data center network. The OVC can be used to manage and set policies on these top-of-the-rack network elements (e.g., network elements 106A-C). In one embodiment, a computing management device can be either an OS or an OVC. While in one embodiment, the network element 100 includes two OS 102A-B/OVC 104A-B, in alternate embodiments there can be more or less OS and/or OVC, or there can be different numbers of OS or OVC.

In this arrangement, each of the OS/OVC systems has an entire view of the network 100. This can mean that each of the OS/OVC systems can manage any and all of the devices in the network (e.g., network elements 106A-C and/or servers 108A-I). A problem can occur if the enterprise uses two (or more) different OS/OVC to manage the enterprise network. It is hard to integrate multiple OS/OVC in the same network because the multiple OS/OVCs, especially if from different vendors, may try to manage and possibly configure the same devices. For example, two different OS/OVC from different vendors could give a network element configuration that can be inconsistent with the functions the OS/OVC are trying to configure on that device. As another example and embodiment, the two OS 102A-B/OVC 104A-B try to place the same port of the same network element in different virtual networks, when really that port should have been managed by only one of the OS 102A-B/OVC 104A-B. Alternatively, the two OS 102A-B/OVC 104A-B try to put different ports on the same switch into the same virtual network, inadvertently connecting them together into the same bridging domain.

Figure 2:
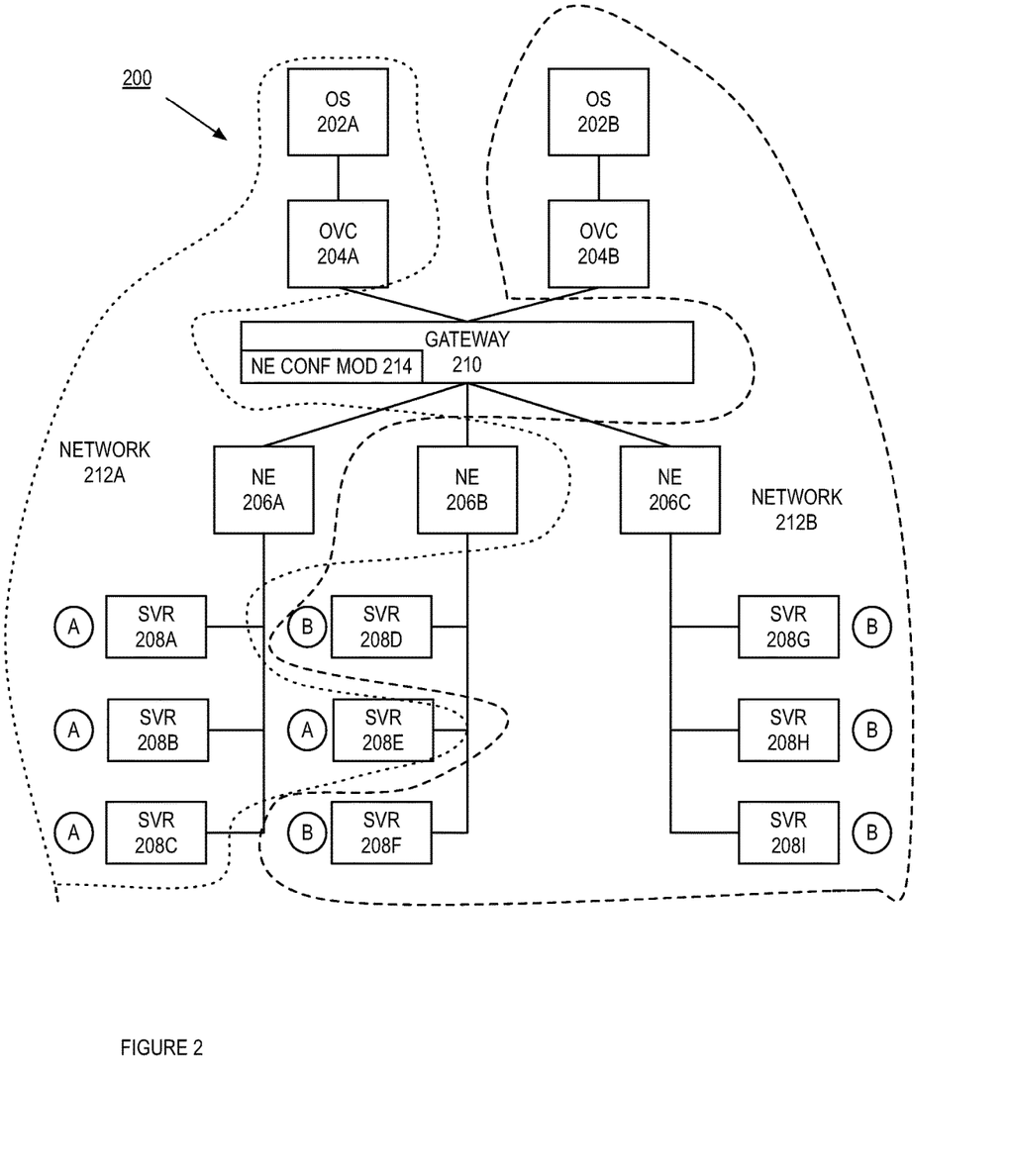
FIG. 2 is an illustration of one embodiment of a system with a gateway that partitions the network into different views for the multiple OS/OVCs.

FIG. 2 is an illustration of one embodiment of a network 200 with a gateway 210 that partitions the network into different views for the multiple OS/OVCs. In FIG. 2, network 200 includes the network elements 206A-C that are coupled to the servers 208A-I. Furthermore, the OS 202A-B are coupled OVC 204A-B, respectively. While in one embodiment, the network element 100 includes three network elements 206A-C and nine servers 208A-I, in alternate embodiments there can be more or less network elements and/or servers (e.g., hundreds of network elements and thousands of servers). In addition, while in one embodiment, the network element 100 includes two OS 102A-B/OVC 104A-B, in alternate embodiments there can be more or less OS and/or OVC, or there can be different numbers of OS or OVC.

However, unlike in FIG. 1, the OVC 204A-B are coupled to a gateway 210, where the gateway 210 is coupled to the network elements 206A-C. Thus, in this embodiment, the gateway 210 is in the path of communication between the OS 202A-B/204A-B and the rest of the network 200. In another embodiment, the gateway 210 is coupled to the OVC 204A-B and is not in the packet of communication between OS 202A-B/OVC 204A-B and the rest of the network 200. In one embodiment, the gateway 210 is a device that determines which components of the network 200 are being used by a particular OS 202A-B/OVC 204A-B and configure the network elements 206A-C to restrict access to devices that are part of the network used by the OS 202A-B/OVC 204A-B. In this embodiment, the gateway can be a personal computer, server, network element (e.g., router, switch, and/or any other type of device that communicates data on a network), or another type of computing device. By configuring the network elements 206A-C to handle the data communicated through the network elements 206A-C, such as data communicated between OVC 204A-B and servers 208A-I, and/or data communicated between servers 208A-I, the gateway 210 can restrict if and what type of data is forwarded between these devices.

In one embodiment, the gateway 210 can manage the dataflow communicated between the OS 202A-B/OVC 204A-B and servers 208A-I. In this embodiment, the gateway 210 can allow/disallow data with certain characteristics (e.g., discovery protocol data, ports, MAC addresses, virtual network information (VNI) (e.g., VNIs for a Virtual eXtended Local Area Network (VXLAN), and/or other types of data characteristics) between certain pairs of the OS 202A-B/OVC 204A-B and servers 208A-I. For example and in one embodiment, the OS 202A/OVC 204A can be allowed to access and manage servers 208A-C and 208E via network elements 206A-B. In this example, the network elements 206A-B are configured to allow data to flow between these devices and to drop data that originated from or destined to OS 202A/OVC 204A to or from servers 208F-I and 208D. Data communicated between OS 202A/OVC 204A and devices outside of the subnetwork 212A is dropped by one of the network elements 206A-C in the path of the data communicated. By allowing and disallowing certain types of data for OS 202A/OVC 204A, the gateway 210 defines a subnetwork 212A that OS 202A/OVC 204A is allowed to discover and manage the devices within the subnetwork 212A. In this embodiment, which devices (e.g., network elements, servers, and/or other devices in the network 200 are part of which subnetwork 212A-B is configured by a network operator. For example and in one embodiment, the network operator defines that a OS/OVC combination manages a given subsection of the network 200. This definition can be using hardware characteristics (e.g., which network element the device is coupled to, which port of which network element the device is coupled to, and/or another type of hardware characteristic), network characteristics (e.g. if the device is part of a Virtual Local Area Network (VLAN), Virtual eXtended Local Area Network (VXLAN), and/or another type of network characteristic), and/or a combination (e.g., a VXLAN, port, network element combination).

In one embodiment, the gateway 210 can configure the network elements 206A-C such that the servers 208A-I can communicate with other servers 208A-C that are in the same sub-network 212A-B. In this embodiment, the gateway 210 configures network elements 206A-C such that servers 208A-C and E that are part of sub-network 212A can communicate with each other and not the server that are part of sub-network 212B (e.g., servers 208D, F and G-I). In addition, gateway 210 configures network elements 206A-C such that servers 208D, F and G-I that are part of sub-network 212B can communicate with each other and not the servers that are part of sub-network 212A (e.g., servers 208A-C and E). More broadly, based on at least some of the OS 202A-B/OVC 204A-B information, the network elements 206A-C are configured by the gateway 210 such that the devices in the sub-network 212A can see and communicate with each other, but not the devices in the sub-network 212B, and vice versa. In one embodiment, the gateway 210 can configure network elements 210 to accomplish this segmentation of the network 200 using one or more ACLs, segmentation, routing policies, switching policies, security policies, associating a port with a tunnel (e.g., using one or more of a variety of tunneling technologies), Quality of Service policies, and/or other types of technologies that can be used to segment a network. In one embodiment, the gateway 210 configures the network elements 206A-C to create an overlay virtual network between the endpoints in the respective sub-network 212A-B.

In one embodiment, the gateway 210 is acting as a managing service for the particular OS/OVC combination (e.g. OS 202A/OVC 204A or OS 202B/OVC 204B). In this embodiment, the gateway 210 determines which devices this OS/OVC is handling. In turn, the gateway 210 manages the network elements 206A-C for the devices in the subnetwork defined for that OS/OVC.

In another example and embodiment, the OS 202B/OVC 204B can be allowed to discover and manage servers 208F-I and 208B via network elements 206B-C. In this example, the gateway 210 is configures the network elements 206A-C to allow data to flow between these devices and to drop data originated from or destined to OS 202B/OVC 204B to or from servers 208A-C and 208E via network elements 206B-C. Data communicated between OS 202B/OVC 204B and devices outside of the subnetwork 212B is dropped by the respective network elements 206A-C. By allowing and disallowing certain types of data for OS 202B/OVC 204B, the gateway 210 defines a subnetwork 212B that OS 202B/OVC 204B is allowed to discover and manage the devices within the subnetwork 212B.

In one embodiment, the gateway 210 determines which of the network elements 206A-C and/or ports of those network elements 206A-C an OS 202A-B/OVC 204A-B can communicate through to downstream servers 208A-I. In one embodiment, an administrator can configure the gateway 210 as to which of the OS 202A-B/OVC 204A-B can communicate to which servers 208A-I. Alternatively, the gateway 210 can communicate with an OS 202A-B/OVC 204A-B to discover which of the servers 208A-I are For example and in one embodiment, the gateway 210 determines that OS 202A/OVC 204A can communicate with any device coupled to network element 206A and any device coupled to ports one and three on network element 206B. In addition, the gateway 210 determines that OS 202B/OVC 204B can communicate with any device coupled to network element 206C and any device coupled to port two of network element 206B.

In one embodiment, to enforce this network configuration, the gateway 210 can configure the individual network elements 206A-C for this overall network configuration policy. In one embodiment, the gateway 210 can configure the individual ports of the network elements 206A-C using access control lists (ACLs) to allow/disallow data being communicated between a particular OS/OVC and a device coupled to the port. For example and in one embodiment, the gateway 210 can configure network element 206A to allow data to and from OS 202A/OVC 204A. Similarly, the gateway 210 can configure network element 206B to allow data to and from OS 202A/OVC 204A on ports one and three and drop all data to and from OS 202A/OVC 204A on the other ports. In addition, the gateway 210 can configure network element 206C to drop all data to and from OS 202A/OVC 204A all ports. In another example and in one embodiment, the gateway 210 can configure network element 206C to allow data to and from OS 202B/OVC 204B. Similarly, the gateway 210 can configure network element 206B to allow data to and from OS 202B/OVC 204B on port two and drop all data to and from OS 202B/OVC 204B on the other ports. In addition, the gateway 210 can configure network element 206A to drop all data to and from OS 202B/OVC 204B all ports. In these examples, the gateway 210 can configure these network elements 206A-C using ACLs on each of the ports of the network elements 206A-C. In one embodiment, the gateway 210 includes a network element configuration module 214 that configures the network elements 206A-C. Configuration of the network elements 206 by the gateway is further described in FIG. 3 below.

In a further embodiment, the gateway 210 can also present information learned from one OS/OVC to another OS/OVC, such that communication can be established between elements managed by the different OS/OVCs, even though the OS/OVCs do not explicitly support this type of coordination. For example and in one embodiment, the OS 202A/OVC 204A can create a virtual network among a subset of the network 212A for this OS 202A/OVC 204A and the other OS 202B/OVC 204B could create the same virtual network among a subset of the network 212B for this OS 202B/OVC 204B. In this example, the gateway 210 provides each OS 202A-B/OVC 204A-B with the reachability information that each OS 202A-B/OVC 204A-B can reach the devices in the respective virtual networks (e.g., the MAC addresses of the elements of a VXLAN) such that these two virtual networks can form one large tenant network. In another example, each OS 202A-B/OVC 204A-B can create a segment of a VXLAN and the gateway 210 can provide the MAC address of one VXLAN segment corresponding to the OS 202A/OVC 204A to OS 202B/OVC 204B (and vice versa), so that the elements of each VXLAN segment can communicate with each other.

Figure 3:
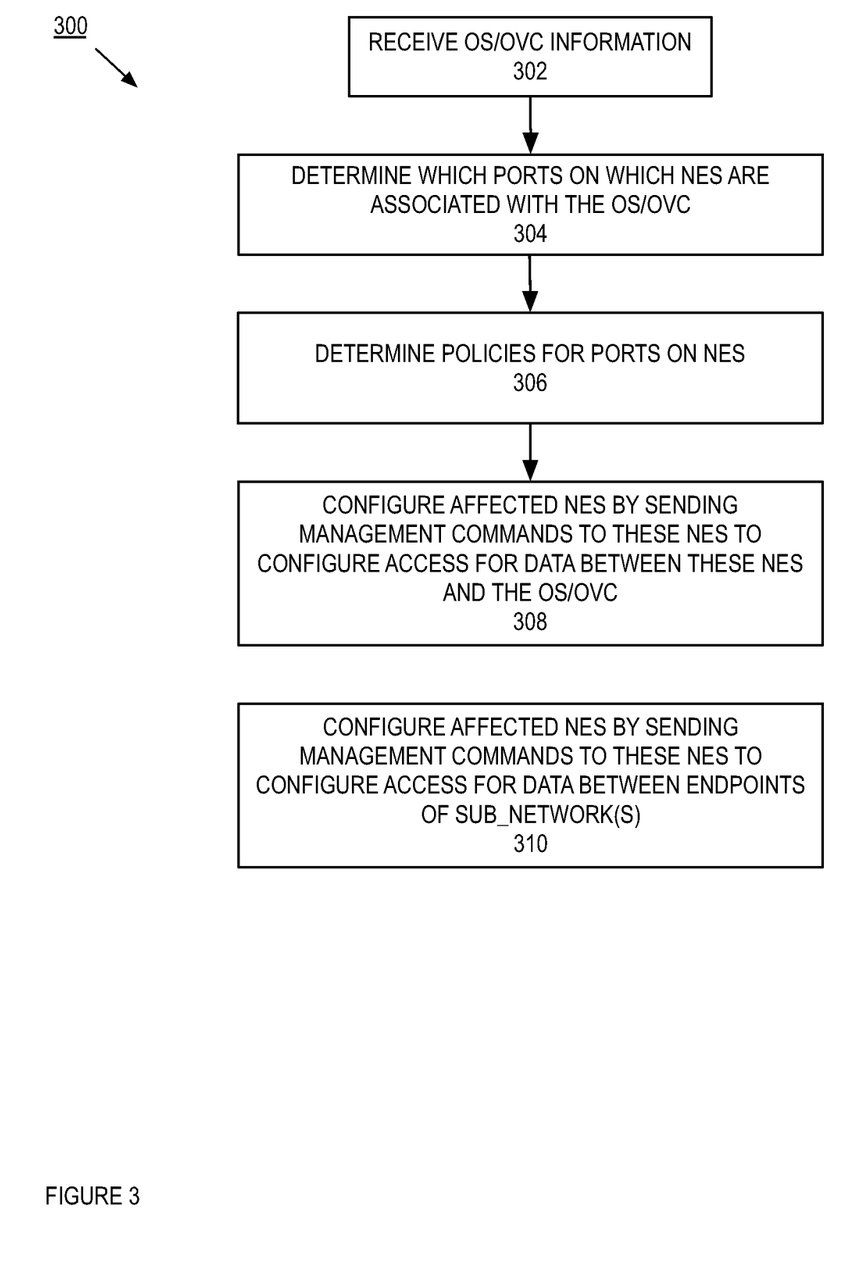
FIG. 3 is a flow diagram of one embodiment of a process to configure the gateway and network elements so as to partition the network into different views for the multiple OS/OVCs.

FIG. 3 is a flow diagram of one embodiment of a process to configure the gateway and network elements so as to partition the network into different views for the multiple OS/OVCs. In one embodiment, process 300 is performed by a network element configuration module that configures the gateway network element so as to partition the network into different views for the multiple OS/OVCs, such as the network element configuration module 214 as described in FIG. 2 above. In FIG. 3, process 300 begins by receiving the OS/OVC information at block 302. In one embodiment, the OS/OVC information is information that indicates to the gateway, which devices in the network and OS/OVC system can communicate with. In this embodiment, the OS/OVC information may be configured by an administrator, retrieved from a network management system, and/or another way to designate which devices in the network the OS/OVC system can manage. At block 304, process 300 determines which ports on which network elements are associated with the OS/OVC system. In one embodiment, process 300 determines which of the ports on which of the known network elements are allowed to or disallowed from passing data for the OS/OVC system and further determines which of the ports this OS/OVC system cannot use for communicating data. For example and in one embodiment, as described in FIG. 2 above, OS 202A/OVC 204A can communicate with any device coupled to network element 206A and ports one and three of network element 206B. Furthermore, OS 202A/OVC 204A cannot communicate with the device coupled to ports that are not one or three of network element 206B or any device coupled to network element 206C.

At block 306, process 300 determines policies for the ports on the network elements. In one embodiment, process 300 uses the determination at block 304 to configure a set of policies for the network elements that the gateway will used to enforce this network configuration. For example and in one embodiment, process 300 sets a policy that allows a port to communicate data on a network element, where an OS/OVC is configured to communicate data with a device coupled to the network element on this port. Conversely, process 300 sets a policy that disallows a port to communicate data on a network element, where the device coupled to the network element on this port is not part of the OS/OVC sub-network. Determining the policies is further described in FIG. 4 below.

Process 300 configures the affected network elements by sending management commands to these network elements to configure access for data between these network elements in the OS/OVC system at block 308. In one embodiment, process 300 sends management commands that specifically allow/disallow access for data communicated between the OS/OVC system on each of the ports of the network elements. For example and in one embodiment, process 300 would send one or more management commands to network element 206A that configures ACLs that allow data that is sourced from or destined to the OS/OVC system on each of the ports of network element 206A. In addition, process 300 can send one or more management commands to network element 206B that configures ACLs that allow data that is sourced from or destined to the OS/OVC system on ports one and three of network element 206B and disallows data that is sourced from or destined to the OS/OVC system on the other ports of network element 206B. Furthermore, process 300 can send one or more management commands to network element 206C that configures ACLs that disallow data that is sourced from or destine to the OS/OVC system on any of the ports of this network element. In this embodiment, by configuring the network elements in the network that restricts which devices in the network the OS/OVC system can communicate with, process 300 creates a restricted view of the network for the OS/OVC system.

At block 310, process 300 configures affected network elements by sending management commands to these network elements to configure access for data between endpoints in the sub-networks in the network. In one embodiment, process 300 configures the network elements such that the servers (and/or other endpoints) can communicate with other servers that are in the same sub-network. In this embodiment, the process 300 configures network elements such that servers and/or other endpoints that are part of one sub-network can communicate with each other and not the servers and/or other endpoints that are part of another sub-network 212. More broadly, based on at least some of the OS/OVC information, the network elements 206A-C are configured by process 300 such that the devices in one sub-network 212 can see and communicate with each other, but not the devices in another sub-network 212, and vice versa. In one embodiment, process 300 can configure network elements to accomplish this segmentation of a network using one or more ACLs, segmentation, routing policies, switching policies, security policies, associating a port with a tunnel (e.g., using one or more of a variety of tunneling technologies), Quality of Service policies, and/or other types of technologies that can be used to segment a network. In one embodiment, process 300 configures the network elements to create an overlay virtual network between the endpoints in the respective sub-network.

In one embodiment, process 300 can perform either the actions at block 308 or block 310, or perform both actions at blocks 308-310. In one embodiment, process 300 partitions the network into different views for the multiple OS/OVCs by the affected network elements by sending management commands to these network elements to configure access for data between these network elements in the OS/OVC system as described in block 308. Alternatively, process 300 partitions the network into different views for the multiple OS/OVCs by the affected network elements by configuring affected network elements by sending management commands to these network elements to configure access for data between endpoints in the sub-networks in the network as described in block 310. In another embodiment, process 300 partitions the network into different views for the multiple OS/OVCs by the affected network elements by performing the actions in block 308 and 310.

Figure 4:
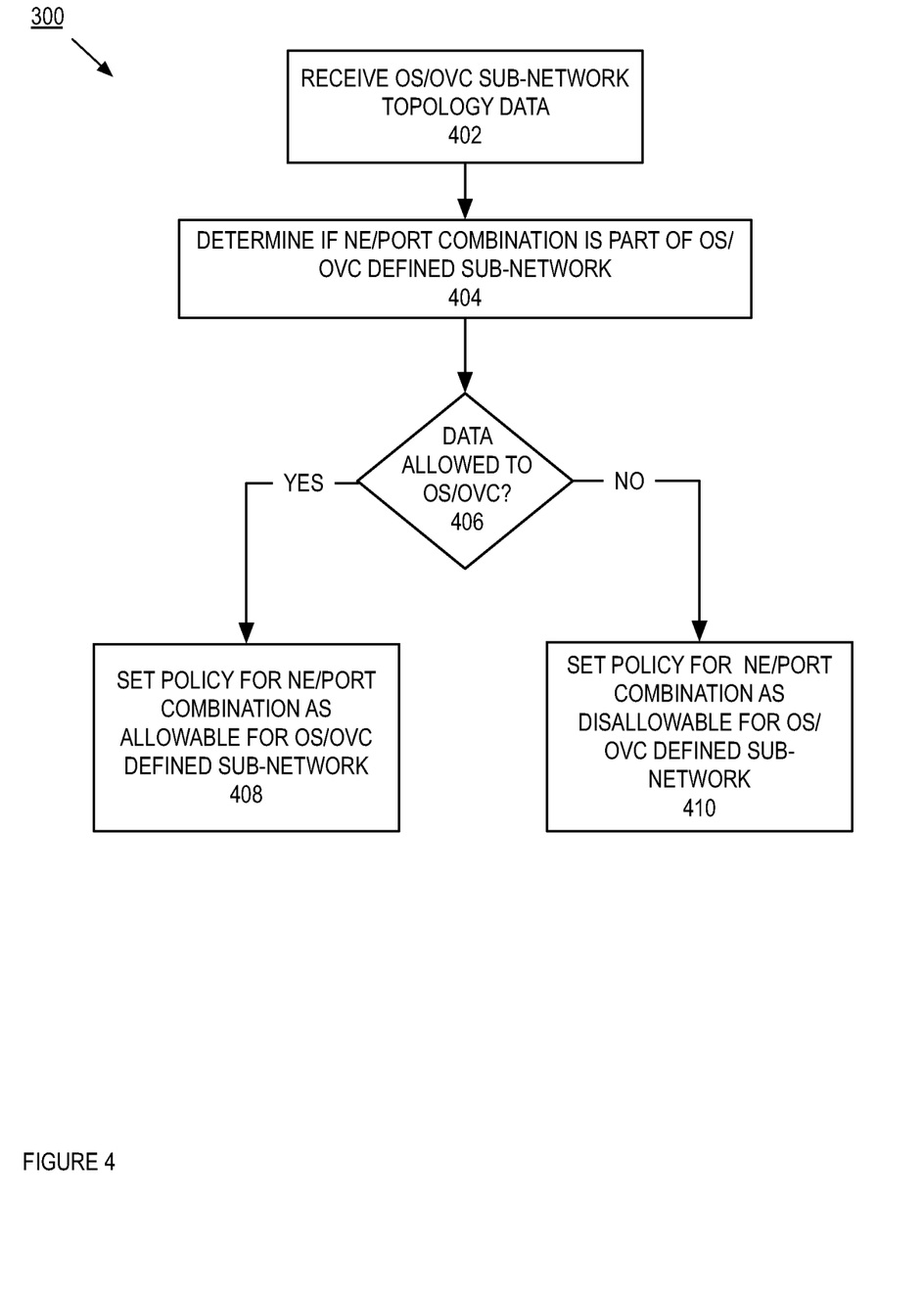
FIG. 4 is an illustration of one embodiment of a flow diagram of one embodiment of a process to determine policies for ports of the network elements for one or more OS/OVCs.

FIG. 4 is an illustration of one embodiment of a flow diagram of one embodiment of a process to determine policies for ports of the network elements for one or more OS/OVCs. In one embodiment, process 400 is performed by process 300 above at block 306 above. In FIG. 4, process 400 begins by receiving OS/OVC sub-network topology data at block 402. In one embodiment, the OS/OVC sub-network topology data is data that indicates which devices are coupled to which network element/port combinations. At block 404, process 400 determines if the network element and network element port combination is part of the sub-network defined for this OS/OVC system. In one embodiment, process 400 determines which network element and port combination the data is associated with and determines if this network element and port combination is allowed to communicate with the OS/OVC system. If, at block 406, the data is allowed to be transmitted to the OS/OVC system, process 400 sets a policy for the network element/port combination as being allowable for the OS/OVC defined sub-network at block 408. In one embodiment, process 400 can set an ACL policy for this port that permits data communication for between one or more of the OS/OVC of this sub-network and data with an address for a device that is part of the defined OS/OVC sub-network. If the data is not allowed to be transmitted to the OS/OVC system, at block 410, process 400 sets a policy for the network element/port combination as being disallowable for the OS/OVC defined sub-network. In one embodiment, process 400 can set an ACL policy for this port that denies data communication for between one or more of the OS/OVC of this sub-network and data with an address for a device that is part of the defined OS/OVC sub-network.

Figure 5:
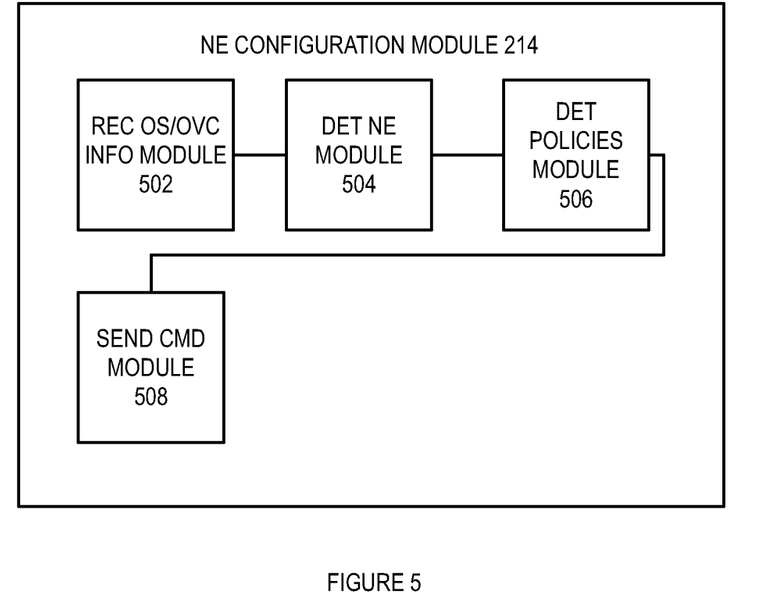
FIG. 5 is a block diagram of a network element configuration module that configures the gateway and network elements so as to partition the network into different views for the multiple OS/OVCs.

FIG. 5 is a block diagram of a network element configuration module 214 that configures the gateway and network elements so as to partition the network into different views for the multiple OS/OVCs. In one embodiment, the network element configuration module 214 includes a receive OS/OVC information module 502, determine network element module 504, determine policies module 506, and send command module 508. In one embodiment, the receive OS/OVC information module 502 receives the OS/OVC connectivity information as described in the FIG. 3, block 302 above. The determine network element module 504 determines the port policies as described in the FIG. 3, block 304 above. The determine policies module 506 determine the policies as described in the FIG. 3, block 306 above. The send command module 508 sends the management commands to the network elements as described in the FIG. 3, blocks 308 and 310 above.

Figure 6:
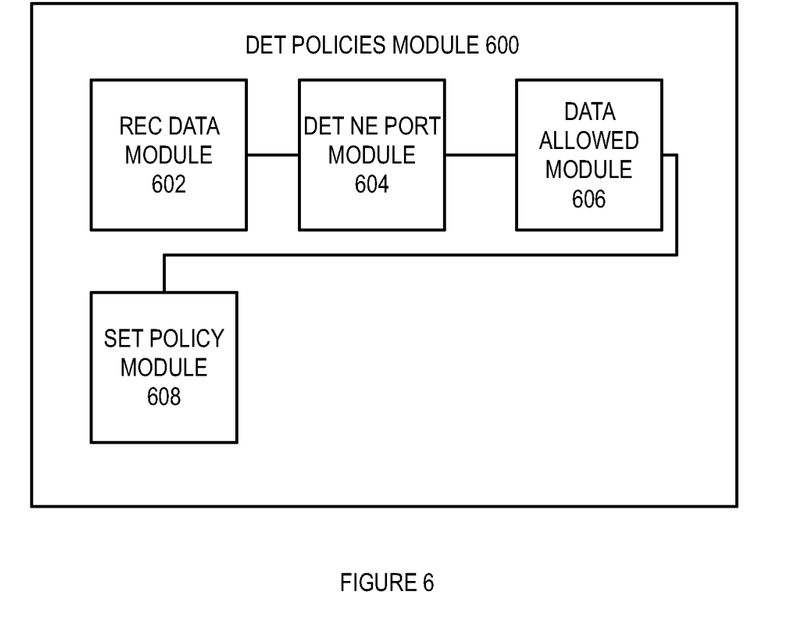
FIG. 6 is a block diagram of a determine policies module that determine policies for data communicated in a sub-network.

FIG. 6 is a block diagram of a determine policies module 600 that determines policies for data communicated in a sub-network. In one embodiment, the determine policies module 602 include receive data module 602, determine network element port module 604, data allowed module 606, and transmit module 608. In one embodiment, the receive data module 602 receives the management data as described in FIG. 4, block 402 above. The determine network element port module 604 determines if the network element port combination is part of the OS/OVC defined sub-network as described in FIG. 6, block 604 above. The data allowed module 606 determines if the data is allowed to be transmitted as described in FIG. 6, block 606 above. The set policy module 608 set the policies as described in FIG. 6, blocks 608 and 610 above.

Figure 7:
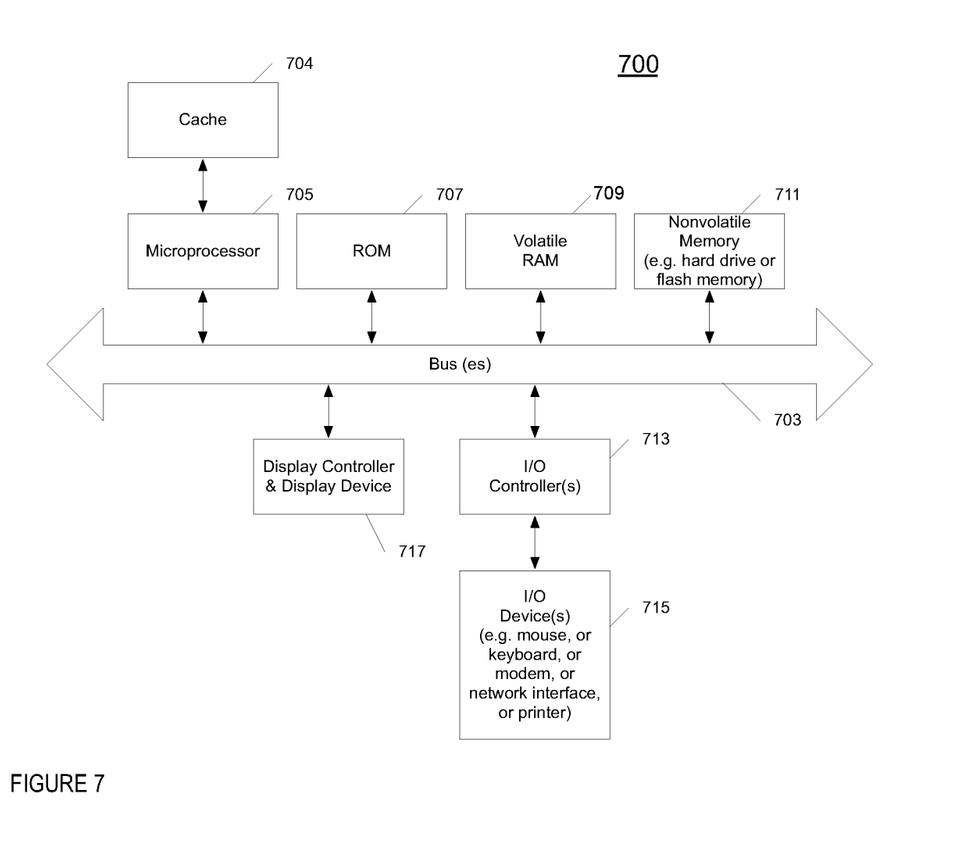
FIG. 7 illustrates one example of a typical computer system, which may be used in conjunction with the embodiments described herein.

FIG. 7 shows one example of a data processing system 700, which may be used with one embodiment of the present invention. For example, the system 700 may be implemented including a gateway 210 as shown in FIG. 2. Note that while FIG. 7 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 7, the computer system 700, which is a form of a data processing system, includes a bus 703 which is coupled to a microprocessor(s) 705 and a ROM (Read Only Memory) 707 and volatile RAM 709 and a non-volatile memory 711. The microprocessor 705 may retrieve the instructions from the memories 707, 709, 711 and execute the instructions to perform operations described above. The bus 703 interconnects these various components together and also interconnects these components 705, 707, 709, and 711 to a display controller and display device 715 and to peripheral devices such as input/output (I/O) devices which may be mice, keyboards, modems, network interfaces, printers and other devices which are well known in the art. In one embodiment, the system 700 includes a plurality of network interfaces of the same or different type (e.g., Ethernet copper interface, Ethernet fiber interfaces, wireless, and/or other types of network interfaces). In this embodiment, the system 700 can include a forwarding engine to forward network date received on one interface out another interface.

Typically, the input/output devices 715 are coupled to the system through input/output controllers 717. The volatile RAM (Random Access Memory) 709 is typically implemented as dynamic RAM (DRAM), which requires power continually in order to refresh or maintain the data in the memory.

The mass storage 711 is typically a magnetic hard drive or a magnetic optical drive or an optical drive or a DVD RAM or a flash memory or other types of memory systems, which maintain data (e.g. large amounts of data) even after power is removed from the system. Typically, the mass storage 711 will also be a random access memory although this is not required. While FIG. 7 shows that the mass storage 711 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 703 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 8:
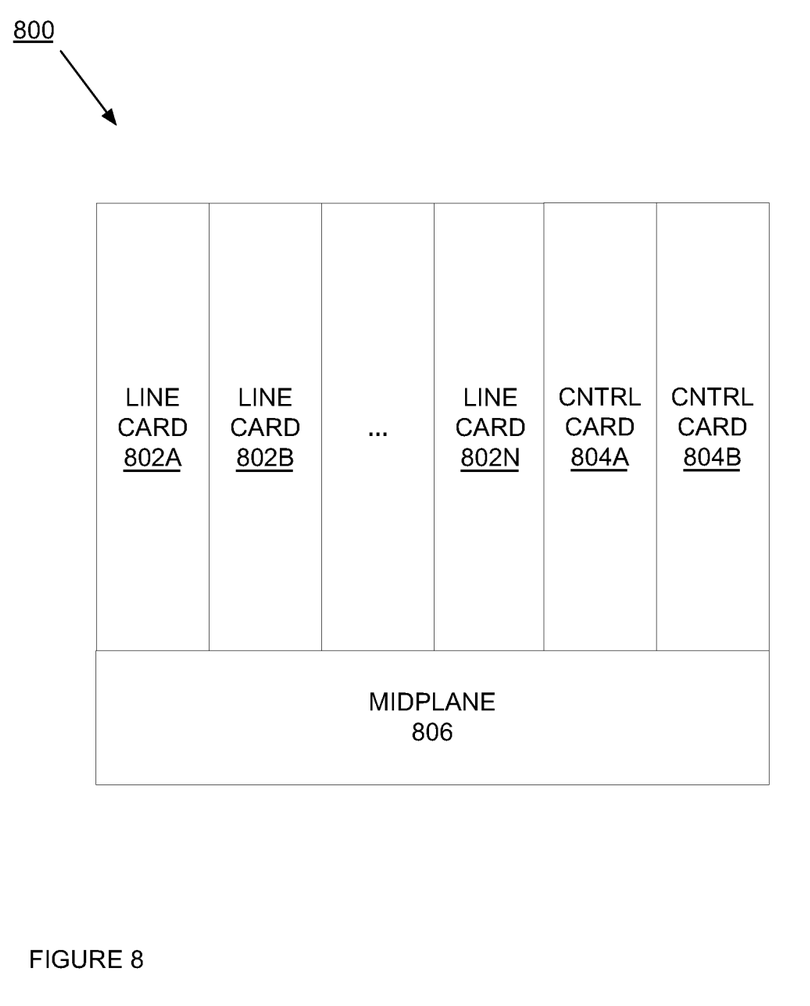
FIG. 8 is a block diagram of one embodiment of an exemplary network element that restricts data communicated between a plurality of computing management devices and a plurality of computing devices.

FIG. 8 is a block diagram of one embodiment of an exemplary network element 800 that restricts data communicated between a plurality of computing management devices and a plurality of computing devices. In FIG. 8, the midplane 806 couples to the line cards 802A-N and controller cards 804A-B. While in one embodiment, the controller cards 804A-B control the processing of the traffic by the line cards 802A-N, in alternate embodiments, the controller cards 804A-B, perform the same and/or different functions (e.g., restricting data communicated between a plurality of computing management devices and a plurality of computing devices, etc.). In one embodiment, the line cards 802A-N process and forward traffic according to the network policies received from controller cards the 804A-B. In one embodiment, the controller cards 804A-B and/or line cards 802A-N restricts data communicated between a plurality of computing management devices and a plurality of computing devices as described in FIGS. 3 and 4. In this embodiment, any or all of the controller cards 804A-B and/or line cards 802A-N includes the network element configuration module, such as the network element configuration module 214 as described in FIG. 2 above. It should be understood that the architecture of the network element 800 illustrated in FIG. 8 is exemplary, and different combinations of cards may be used in other embodiments of the invention.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "configuring," "receiving," "forwarding," "dropping," "allowing," "communicating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units in a gateway to perform a method to restrict data communicated between a plurality of computing management devices and a plurality of computing devices, the method comprising:
   receiving network connectivity information of a network for a plurality of computing management devices and a plurality of computing devices, wherein the plurality of computing management devices is communicatively coupled to a plurality of network elements via the gateway, wherein the plurality of computing devices is communicatively coupled to the plurality of computing management devices via the plurality of network elements and the gateway, wherein the network connectivity information indicates which computing management devices are configured to manage which computing devices;
   determining a plurality of sub-networks using at least the network connectivity information, including identifying ports among the network elements that provide a data path between a given computing managing device and the computing devices managed by the given computing managing device, configuring the identified ports to allow data communication for the given computing managing device, and configuring remaining unidentified ports to disallow data communication for the given computing managing device, wherein for each of the plurality of sub-networks, at least one of the plurality of computing management devices and a subset of the plurality of computing devices is associated with that sub-network and the at least one of the plurality of computing management devices is configured to manage the subset of the plurality of computing devices; and
   for each sub-network in the plurality of sub-networks and for each pair of computing devices in said each sub-network,
      determining a policy for data being communicated between said each pair of computing devices, and
      configuring at least one of the plurality of network elements to allow data communicated between said each pair of computing devices using at least the policy.

2. The non-transitory machine-readable medium of claim 1, further comprising:
   configuring at least one of the plurality of network elements coupled to said each pair of computing devices to deny data communicated between a first one of the plurality of computing devices from a first subset of the plurality of computing devices in a first one of the plurality of sub-networks and a second one of the plurality of computing devices from a second subset of the plurality of computing devices in a second one of the plurality of sub-networks.

3. The non-transitory machine-readable medium of claim 1, wherein the policy is an Access Control List.

4. The non-transitory machine-readable medium of claim 1, wherein a computing management device is selected from the group consisting of an orchestration system and an overlay controller.

5. The non-transitory machine-readable medium of claim 4, wherein an orchestration system allows for the automated arrangement, coordination, and management of computer systems, middleware, and services.

6. The non-transitory machine-readable medium of claim 4, wherein an overlay controller manages the network elements that are used to support servers and virtual machines that comprise the computing devices managed by the orchestration system.

7. The non-transitory machine-readable medium of claim 1, wherein the policy setting is based on at least a data characteristic selected from the group consisting of an associated port, virtual network identifier, and an address.

8. The non-transitory machine-readable medium of claim 7, wherein the address is a media access control address.

9. The non-transitory machine-readable medium of claim 1, further comprising:
   determining which of the plurality of computing management devices are allowed to communicate with which of the plurality of computing devices; and
   for each pair of one of the plurality of computing management machines and one of the plurality of computing devices, determining a first policy for data being communicated between said one of the plurality of computing management devices and said one of the plurality of computing devices.

10. The non-transitory machine-readable medium of claim 9, wherein the determining comprises:
   configuring one of the plurality of network elements coupled to said one of the computing devices to allow data communication between said one of the plurality of computing devices and said one of the plurality of computing management devices.

11. A method to restrict data communicated between a plurality of computing management devices and a plurality of computing devices, the method comprising a gateway:
   receiving network connectivity information of a network between a plurality of computing management devices and a plurality of computing devices, wherein the plurality of computing management devices is communicatively coupled to a plurality of network elements via the gateway, wherein the plurality of computing devices is communicatively coupled to the plurality of computing management devices via the plurality of network elements and the gateway, wherein the network connectivity information indicates which computing management devices are configured to manage which computing devices;

determining a plurality of sub-networks using at least the network connectivity information, including identifying ports among the network elements that provide a data path between a given computing managing device and the computing devices managed by the given computing managing device, configuring the identified ports to allow data communication for the given computing managing device, and configuring remaining unidentified ports to disallow data communication for the given computing managing device, wherein for each of the plurality of sub-networks, at least one of the plurality of computing management devices and a subset of the plurality of computing devices is associated with that sub-network and the at least one of the plurality of computing management devices is configured to manage the subset of the plurality of computing devices; and for each sub-network in the plurality of sub-networks and for each pair of computing devices in said each sub-network, determining a policy for data being communicated between said each pair of computing devices, and configuring at least one of the plurality of network elements to allow data communicated between said each pair of computing devices using at least the policy.

12. The method of claim 11, further comprising:
configuring one of the plurality of network elements coupled to said each pair of computing devices to deny data communication between a first one of the plurality of computing devices from a first subset of the plurality of computing devices in a first one of the plurality of sub-networks and a second one of the plurality of computing devices from a second subset of the plurality of computing devices in a second one of the plurality of sub-networks.

13. The method of claim 11, wherein the policy is an Access Control List.

14. The method of claim 11, wherein a computing management device is selected from the group consisting of an orchestration system and an overlay controller.

15. The method of claim 14, wherein an orchestration system allows for the automated arrangement, coordination, and management of computer systems, middleware, and services.

16. The method of claim 14, wherein an overlay controller manages the network elements that are used to support servers and virtual machines that comprise the computing devices managed by the orchestration system.

17. The method of claim 11, wherein the policy setting is based on at least a data characteristic selected from the group consisting of an associated port, virtual network identifier, and an address.

18. The method of claim 17, wherein the address is a media access control address.

19. The method of claim 11, further comprising:
determining which of the plurality of computing management devices are allowed to communicate with which of the plurality of computing devices; and for each pair of one of the plurality of computing management machines and one of the plurality of computing devices, determining a first policy for data being communicated between said one of the plurality of computing management devices and said one of the plurality of computing devices.

20. The method of claim 19, wherein the determining comprises:
configuring one of the plurality of network elements coupled to said one of the plurality of computing devices to allow data communication with said one of the plurality of computing management devices.

21. A gateway that restricts data communicated between a plurality of computing management devices and a plurality of computing devices, the gateway comprising:
a processor;
a memory coupled to the processor though a bus; and
a process executed from the memory by the processor causes the processor to receive network connectivity information of a network for a plurality of computing management devices and a plurality of computing devices, wherein the plurality of computing management devices is communicatively coupled to a plurality of network elements via the gateway, wherein the plurality of computing devices are communicatively coupled to the plurality of computing management devices via a plurality of network elements and the gateway, wherein the network connectivity information indicates which computing management devices are configured to manage which computing devices, determine a plurality of sub-networks using at least the network connectivity information, including identifying ports among the network elements that provide a data path between a given computing managing device and the computing devices managed by the given computing managing device, configuring the identified ports to allow data communication for the given computing managing device, and configuring remaining unidentified ports to disallow data communication for the given computing managing device, wherein for each of the plurality of sub-networks, at least one of the plurality of computing management devices and a subset of the plurality of computing devices is associated with that sub-network and the at least one of the plurality of computing management devices is configured to manage the subset of the plurality of computing devices, and for each sub-network in the plurality of sub-networks and for each pair of computing devices in said each sub-network, determining a policy for data being communicated between said each pair of computing devices, and configuring at least one of the plurality of network elements to allow data communicated between said each pair of computing devices using at least the policy.

* * * * *